United States Patent
Lanza et al.

(10) Patent No.: US 11,627,645 B2
(45) Date of Patent: Apr. 11, 2023

(54) MICROWAVE HEATING DEVICE AND METHOD FOR OPERATING A MICROWAVE HEATING DEVICE

(71) Applicant: ILLINOIS TOOL WORKS, INC., Glenview, IL (US)

(72) Inventors: Nicola Lanza, Chioggia (IT); Chiara DeMassari, Costermano (IT); Francesco Gambato, San Giorgio in Bosco (IT); Michele Sclocchi, San Donato Milanese (IT); Andrea Baccara, Chicago, IL (US); Benoît Flipot, La Bazouge des Alleux (FR)

(73) Assignee: Illinois Tool Works Inc., Glenview, IL (US)

( * ) Notice: Subject to any disclaimer, the term of this patent is extended or adjusted under 35 U.S.C. 154(b) by 410 days.

(21) Appl. No.: 16/847,775

(22) Filed: Apr. 14, 2020

(65) Prior Publication Data
US 2020/0245417 A1    Jul. 30, 2020

Related U.S. Application Data

(63) Continuation of application No. 15/444,377, filed on Feb. 28, 2017, now Pat. No. 10,772,166.
(Continued)

(51) Int. Cl.
*H05B 6/68* (2006.01)
*H05B 6/70* (2006.01)
(Continued)

(52) U.S. Cl.
CPC ......... *H05B 6/687* (2013.01); *G05B 13/0265* (2013.01); *H05B 6/664* (2013.01);
(Continued)

(58) Field of Classification Search
CPC .......... H05B 6/68; H05B 6/705; H05B 6/806; H05B 6/687; H05B 6/664; H05B 6/70
(Continued)

(56) References Cited

U.S. PATENT DOCUMENTS

| | | | | |
|---|---|---|---|---|
| 4,196,332 A | * | 4/1980 | MacKay B | H05B 6/806 219/709 |
| 2012/0103972 A1 | * | 5/2012 | Okajima | H05B 6/686 219/490 |

FOREIGN PATENT DOCUMENTS

| | | |
|---|---|---|
| CN | 101860996 A | 10/2010 |
| CN | 102428751 A | 4/2012 |

(Continued)

OTHER PUBLICATIONS

Office Action from related CN application No. 201780027092.4, dated Nov. 4, 2020, all pages cited in its entirety.

*Primary Examiner* — Phuong T Nguyen
(74) *Attorney, Agent, or Firm* — Burr & Forman, LLP

(57) ABSTRACT

A microwave heating device includes at least two radiating portions that are adapted to radiate microwaves to the heating chamber and can be operated according to a plurality of operational configurations that differ in frequency and/or in phase shift(s) between the radiated microwaves. Data of energy efficiency, as a function of operational configurations, can be obtained for a product in the heating chamber. For example, energy efficiency data are obtained through a learning procedure. The obtained data can be processed to select one or more operational configurations ranking high in energy efficiency and a heating procedure for the product inside the heating chamber can be executed by operating the at least two radiating portions according to the selected one or more operational configurations.

9 Claims, 3 Drawing Sheets

Related U.S. Application Data

(60) Provisional application No. 62/306,895, filed on Mar. 11, 2016.

(51) Int. Cl.
*G05B 13/02* (2006.01)
*H05B 6/66* (2006.01)

(52) U.S. Cl.
CPC ............ *H05B 6/686* (2013.01); *H05B 6/70* (2013.01); *H05B 2206/044* (2013.01); *Y02B 40/00* (2013.01)

(58) Field of Classification Search
USPC ................................ 219/490, 709, 750, 716
See application file for complete search history.

(56) References Cited

FOREIGN PATENT DOCUMENTS

| | | |
|---|---|---|
| CN | 102906504 A | 1/2013 |
| EP | 2326142 A4 | 5/2011 |

\* cited by examiner

MICROWAVE HEATING DEVICE AND METHOD FOR OPERATING A MICROWAVE HEATING DEVICE

CROSS REFERENCE TO RELATED APPLICATIONS

This application claims priority to U.S. application No. 62/306,895 filed Mar. 11, 2016, the entire contents of which are hereby incorporated by reference in its entirety.

TECHNICAL FIELD

This disclosure relates in general to the field of electromagnetic heating. Specifically, this disclosure relates to a microwave heating device and a method for operating a microwave heating device, in particular for thawing and/or cooking food products.

BACKGROUND

At present there are many known and widely-used techniques for heating a food product, both for thawing and for cooking.

According to some known heating techniques, the food product receives heat through its outer surface, which exchanges heat with an external heating element or with an external environment which is at a higher temperature. In these techniques, the flow of heat inside the food product is determined by the temperature gradient and by thermal diffusivity of the food product itself.

According to other known heating techniques, heat is generated directly inside the food product by means of electromagnetic fields or electromagnetic radiations. Amongst these, some techniques use radio frequency (RF) dielectric heating and other techniques use microwaves (MW). Conventionally, radio frequency (RF) electromagnetic waves lie within the band of frequencies between 1 and 300 MHz, whilst microwaves (MW) lie within the band of frequencies between 300 MHz and 300 GHz. Generally speaking, radio frequency heating devices and microwave heating devices are known and widely utilized.

Electromagnetic heating techniques that use radio frequency or microwaves are generally useful for achieving shorter thawing or cooking times than techniques that use heat exchange through the surface of the food product. However, a problem common to many known electromagnetic heating techniques relates to the difficulty of performing heating of a specific load of product in a reproducible, efficient manner or complying with other user requirements. That problem normally seems to be more significant for microwave heating devices.

It should be considered that each product has an individual, specific manner to interact with microwaves in a heating chamber of a microwave heating device. Thus, a same operational configuration in terms of frequency and phase shifts of the microwaves may result in efficiency values that are remarkably different from one another when applied to different products to be heated. A similar remark can be made also when spatial uniformity of heating is taken into account. Consequently, when a same operational configuration of the microwave heating device is used for heating different products, it may be found that those products are poorly heated, or overheated or not uniformly heated.

In some prior-art microwave heating devices, cooking recipes are memorized for some product types and can be selected by the user. However, each recipe is based on the behavior of an average product and then its use may result unsatisfactory for an actual load of product.

For example, heating or cooking of an actual load of product may be slower than expected when a memorized recipe for that product is used.

Moreover, it should be considered that a different positioning of a same product in a microwave heating device may entail a different interaction with microwaves and then a different heating of the product. Therefore, a wrong positioning of the product may reduce the performance of a memorized recipe for that product.

Therefore, it would be desirable to have available a method for operating a heating device, in particular using microwaves, that may be adapted to a specific load of product.

BRIEF SUMMARY OF SOME EXAMPLE EMBODIMENTS OF THE SUBJECT OF THE PRESENT DISCLOSURE

Specifically, this disclosure relates to a device and a method that use a microwave heating technique to heat at least one product. In particular example embodiments, the at least one product is a food product and heating is intended to thaw and/or to cook and/or to merely heat the food product.

In some example embodiments, the microwave heating device may comprise a heating chamber for receiving at least one product to be heated, a microwave generating system including at least two radiating portions adapted to radiate microwaves to the heating chamber, a control unit. The microwave generating system may generate and radiate, via the at least two radiating portions, respective microwaves having a same frequency and different phases. Therefore, one of the radiating portions may be taken as a reference radiating portion and the microwaves of the other radiating portion (or the other radiating portions) may have respective phase shift (or phase shifts) from the microwaves of the reference radiating portion. An operational configuration for the microwave generating system may be defined by the frequency value and the phase shift value (or values).

In some example embodiments, the microwave generating system may comprise four radiating portions. Consequently, each operational configuration may be defined by a frequency value and three phase shift values. The phase combinations of the operational configurations may be represented as points in a three-dimensional space of phase shifts.

The control unit may be designed to operate the microwave generating system and to change the frequency and the phase shift (or phase shifts) of the microwaves generated by the microwave generating system. Thus, the at least two radiating portions can be operated according to a plurality of operational configurations that differ from one another in frequency and/or in phase shift (or phase shifts) between the radiated microwaves. An energy efficiency, that is inversely related to a ratio of reflected power over radiated power, is associated with each operational configuration. The microwave heating device may include a reflected power detecting system and the control unit may be configured to calculate that energy efficiency.

According to an aspect of the present disclosure, the control unit may be designed to operate the microwave generating system in such a way that heating or cooking of the at least one product is fast or as fast as possible. That aim may be achieved by operating the microwave generating system in one or more operational configurations that rank high in energy efficiency. That is based on the assumption that a high energy efficiency should mean that a large share of radiated power is absorbed by the product in the heating chamber and converted into heat. A heating procedure according to the present disclosure may be useful for products where heating homogeneity is not a primary issue and hot spots may be tolerated during heating. For example, this is the case of soups and other liquid products, where a temperature homogeneity may be obtained after heating by stirring the product.

According to one possible method of use, data of energy efficiency as a function of operational configurations may be obtained for the product that has been positioned in the heating chamber. The obtained data may be processed by the control unit to select one or more operational configurations ranking high in energy efficiency. Then, the at least two radiating portions may be operated in the selected operational configurations in order to heat the product.

According to one possible selection criterion, the operational configuration with the highest energy efficiency may be selected as a single operational configuration for the heating procedure. That may be useful for heating as fast as possible, because the radiated power transferred to the product is maximized.

According to another possible selection criterion, a plurality of operational configurations with an energy efficiency that is higher than a threshold value or within a range may be selected.

According to another possible selection criterion, a plurality of operational configurations with frequency different from one another are selected by choosing, for each frequency, the operational configuration with the highest energy efficiency at that frequency.

According to another possible selection criterion, a pre-established number of operational configurations are selected among the operational configurations ranking higher in energy efficiency.

When a plurality of operational configurations are selected, the heating procedure is executed by sequentially operating the microwave generating system in the selected operational configurations. That may be useful for achieving a fast heating while reducing intensity of hot spots that could locally damage the product. As a matter of fact, different operational configurations produce hot spots that are differently positioned in the product.

In some example embodiments, the control unit may be configured to obtain energy efficiency data by running a learning procedure, after the at least one product has been positioned inside the heating chamber. During the learning procedure, frequency and phase shift(s) are changed to sequentially operate the at least two radiating portions in several operational configurations. For each frequency, a number of operational configurations differing in phase shift(s) from one another may be chosen and the at least two radiating portions may be operated in those chosen configurations. To be more specific, during the learning procedure the frequency is changed over a range and, for each frequency, a number of operational configurations differing in phase shift(s) from one another are chosen.

The energy efficiency may be calculated for each of said several operational configurations for the learning procedure and the obtained data of energy efficiency may be saved. In this way, data of energy efficiency as a function of operational configurations can be obtained for the at least one product in the heating chamber.

That is useful for directly obtaining information about how much a specific load in the heating chamber interacts with microwaves and how such an interaction varies when frequency and/or phase shifts are changed. As a matter of fact, each load introduced in the heating chamber has features that differ from other loads. In particular, the learning procedure may allow mapping of energy efficiency, as a function of frequency and phase shifts, for the specific load of product to be heated. The learning procedure is useful for allowing to best set the operational configurations for the specific product that is in the heating chamber. That may be useful in businesses where a variety of foods should be heated or cooked. The short duration of the learning procedure does not influence the whole cooking process and the learning procedure may be repeated from time to time without any problem during cooking.

In other words, the learning procedure may implement an adaptive algorithm that allows adaptation of the heating procedure to the specific load, regardless of whether the load has been studied previously. The data obtained in the learning procedure may be used to select one or more operational configurations for the heating procedure: during the heating procedure, the at least two radiating portions are operated according to at least one operational configuration that is selected on the basis of the data obtained in the learning procedure.

In other example embodiments, energy efficiency data may be already available to the control unit for that specific load, without the need of a learning procedure. For example, those data could have been obtained for an identical load during a previous learning procedure and were saved, so that the control unit may retrieve them when heating of an identical product is required. In another example, those data could have been obtained and processed in a set-up phase for the microwave heating device and saved as a specific recipe for that particular type of product. Thus, the operations of obtaining and processing energy efficiency data may be carried out only once for each type of product and a specific recipe may be recalled for cooking a corresponding product. These example embodiments may be suitable for particular types of food products that should be placed in certain fixed positions in the heating chamber of the microwave heating device. That may be useful in businesses such as fast food shops, where the range of products to be cooked is very limited and the products are standardized in terms of quantity, shape and size.

BRIEF DESCRIPTION OF THE DRAWINGS

Having herein described the subject of this disclosure in general terms, further features and methods of use will become apparent in the following detailed description of some example embodiments, provided by way of example and without limiting the scope of the disclosure. Reference will be made to the appended figures, which are schematic drawings not necessarily to scale, in which.

DETAILED DESCRIPTION OF EXAMPLE EMBODIMENTS

Figure 1:
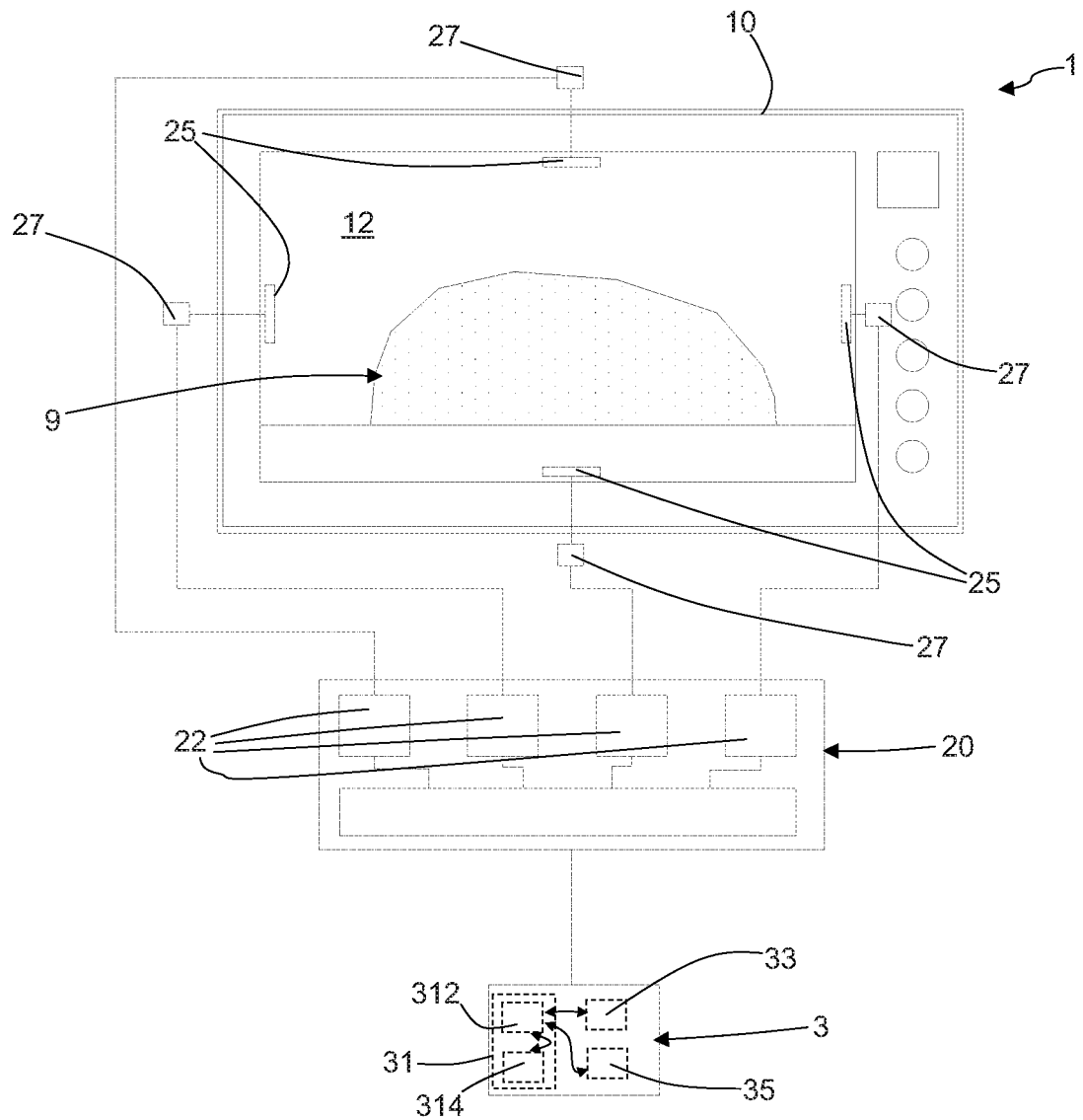
FIG. 1 is a schematic view of an example embodiment of a microwave heating device according to this disclosure, some components thereof being simply depicted as block elements.

An example embodiment of a microwave heating device according to this disclosure is labelled with the numeral 1 and is schematically illustrated in FIG. 1.

FIG. 1 shows several components of the device 1 to make this description easier to understand. Some components in dashed lines are shown outside a structure of the device 1 merely to allow a functional representation thereof. However, the figure should not be taken to be a precise and detailed technical drawing to be used for production purposes. Therefore, FIG. 1 does not show all of the components of the device 1 and shall not be considered to be a drawing in which the scale and proportions between the parts are faithfully reproduced.

The microwave heating device 1 may be used for heating at least one product 9, in particular at least one food product, e.g., a food, a dish, a piece of meat, a vegetable product. According to one mode of use, the microwave heating device 1 may be used for heating a single load or portion of a product 9. According to another mode of use, the microwave heating device 1 may be used for simultaneously heating several loads or portions of a product 9. According to some modes of use, the food product 9 to be heated may be a frozen (or deep-frozen) food product and the device 1 can be used to thaw such a frozen food product 9. According to other modes of use, the device 1 may be used to cook the food product 9.

The device 1 comprises a supporting structure 10, which for example comprises a box-shaped casing and/or a framework that supports the other components of the device 1. The device 1 also comprises a heating chamber 12 which is designed to receive the at least one food product 9 to be heated. For example, the heating chamber 12 is located inside the supporting structure 10. The device 1 may comprise a door (not shown) that may alternatively be opened to allow access to the heating chamber 12 and closed to perform heating of the food product 9 in the closed heating chamber 12.

The device 1 comprises a control unit 3 and a microwave generating system 20 which includes at least two radiating portions 25. In the example embodiment in FIG. 1, the microwave generating system 20 comprises four of said radiating portions 25. In other example embodiments, the radiating portions 25 may be two, three or more than four.

The at least two radiating portions 25 are facing the heating chamber 12. The microwave generating system 20 is designed to generate microwaves and the at least two radiating portions 25 are adapted to radiate microwaves to the heating chamber 12.

In some embodiments, the generation of microwaves is made by solid-state generators. To be more specific, the microwave generating system 20 comprises solid-state power amplifiers 22, each of them being connected with a respective radiating portion 25. The power amplifiers 22 may be controlled independently from one another, for example by the control unit 3, so that the signal generated by each of them may be controlled in terms of frequency, phase and amplitude. The generated signal is received by the respective radiating portion 25 to radiate a corresponding microwave. Thus, the microwaves radiated by the radiating portions 25 can be changed in frequency, phases and/or power.

In some embodiments, the working range for microwave frequency may be between 2400 MHz and 2500 MHz. In other embodiments, the working range for microwave frequency may span the whole band of frequencies between 300 MHz and 300 GHz.

In some embodiments, the working range for microwave phases may be between 0° and 360°. In some embodiments, a maximum value for power provided by each power amplifier 22 may be 200 W. Obviously, lower or higher power values are possible in other example embodiments.

In some embodiments, the microwave generating system 20 may be designed to generate and radiate, via the at least two radiating portions, respective microwaves that have a same frequency and different phases.

In one example embodiment having two radiating portions, the two radiated microwaves may have phases that are different from each other. Thus, one radiating portion can be taken as a reference radiating portion and the microwaves radiated by the other radiating portion can have a phase shift from the microwaves radiated by the reference radiating portion.

In other example embodiments having more than two radiating portions, the radiated microwaves may have phases that are different from one another. Thus, one radiating portion can be taken as a reference radiating portion and the microwave radiated by each of the other radiating portions can have a respective phase shift from the microwave radiated by the reference radiating portion. In the specific example embodiment of FIG. 1 having four radiating portions 25, three phase shifts are defined.

The frequency value and the phase shift value (or values) identify or define an operational configuration of the microwave generating system 20. In other words, an operational configuration is a combination of frequency and phases that the microwave generating system 20 can be operated with. In the specific example embodiment with four radiating portions 25, each operational configuration is defined by a frequency value and three phase shift values.

In addition to the operational configuration defined by frequency and phases, the operative conditions of the microwave generating system 20 include also the power level at which the radiating portions 25 are set.

The control unit 3 may be designed to operate the microwave generating system 20 and to change the frequency and the phase shift(s) of the microwaves generated by the microwave generating system 20. In other words, the control unit 3 may be designed to set a plurality of operational configurations, according to which the microwave generating system 20 can be operated. Moreover, the control unit 3 may adjust the power level of each radiating portion 25. In particular, the radiating portions 25 may be operated with a same power level, i.e., the microwaves radiated by them may have all a same power.

During use of the microwave heating device 1, a radiated power is associated with the microwaves radiated by the radiating portions 25 and the radiated power is partially absorbed by the to-be-heated food product 9 located inside the heating chamber 12. An absorbed share of the radiated power is converted into heat in the food product 9, whereas a remaining share of the radiated power is reflected by the heating chamber 12.

In some embodiments, the microwave heating device 1 comprises a reflected power detecting system, which is configured to detect the share of radiated power that is reflected by the heating chamber 12. To be more specific, the reflected power detecting system may comprise a plurality of detectors 27, one for each radiating portion 25. Each detector 27 may be adapted to detect the microwave power that is returned to the respective radiating portion 25 by the heating chamber 12.

For example, each detector 27 is an electric-power detector that is positioned between a power amplifier 22 and the respective radiating portion 25. Moreover, radiated power (or forward power) may be detected or measured for each radiating portion 25. For example, the reflected power detecting system and radiated power detectors may be included in electronic circuitry of the microwave heating device 1.

In some embodiments, the control unit 3 may be connected with the reflected power detecting system (and also with the radiated power detectors) and may be configured to calculate an energy efficiency that is inversely related to a ratio of reflected power over radiated power. For example, radiated power ($P_{rad}$) may be calculated as a sum of individual powers radiated by the radiating portions 25; reflected power ($P_{ref}$) may be calculated as a sum of individual reflected powers detected by the detectors 27. Energy efficiency (Eff), in percentage, may be calculated as follows: $Eff=(1-P_{ref}/P_{rad})*100$.

The control unit 3 may be designed to calculate an energy efficiency value for each operational configuration of the microwave generating system 20.

Figure 2:
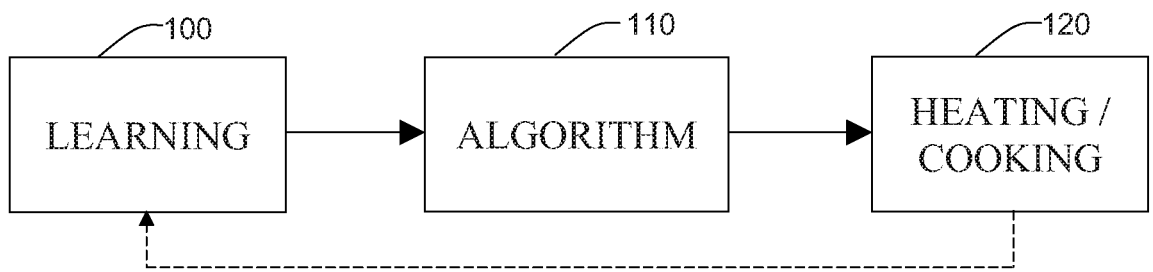
FIG. 2 is a block diagram of a possible method of use for a microwave heating device according to this disclosure.

As schematically shown in FIG. 2, a learning procedure 100, which is intended to "understand" the food product 9, may be executed before a heating procedure 120, which is intended to heat and/or cook the food product 9.

An algorithm 110 may be used after the learning procedure 100 and before heating or cooking 120, in order to select the operational conditions of the subsequent heating procedure on the basis of the results obtained in the learning procedure 100. The control unit 3 may be configured to run those procedures.

The learning procedure 100 may have a basic function of evaluating how the food product 9 in the heating chamber 12 interacts with microwaves, in order to allow a favorable setting of the parameters of the microwave generating system 20, that setting being tailored to the specific food product 9. In other words, the learning procedure 100 may be an inspection that aims at testing the food product 9 and identifying the best heating conditions for the food product 9 in the heating chamber 12. It should be noticed that the learning procedure 100 is executed while the to-be-heated food product 9 is inside the heating chamber 12. Therefore, the food product 9 should be positioned in the heating chamber 12 before starting the learning procedure 100.

Basically, the learning procedure 100 may include applying to the food product 9 microwaves according to a plurality of different operational configurations, by sequentially operating the radiating portions 25 with different phases and different frequencies (but at the same time with the same frequency for all radiating portions 25).

During the learning procedure 100, the control unit 3 may operate the microwave generating system 20 with frequency and phase shift (or shifts) that are changed over respective ranges and the energy efficiency may be calculated for each of the corresponding operational configurations. In other words, a number of configurations are sequentially analyzed and energy efficiency is calculated for each configuration.

For example, frequency may be changed over a range between 2400 MHz and 2500 MHz, with a frequency step of 10 MHz. In other embodiments, frequency may be changed over the range between 300 MHz and 300 GHz. For each frequency, a number of combinations of phases may be chosen by changing phase shift (or shifts) over a respective phase range with a phase step. To be more specific, the phase range is an interval between 0° and 360° and the phase step may be constant over the interval. For example, the phase step is 45°. It should be taken into account that a phase shift of 0° is equivalent to a phase shift of 360°, then the corresponding operational configurations are to be considered only once.

Figure 3:
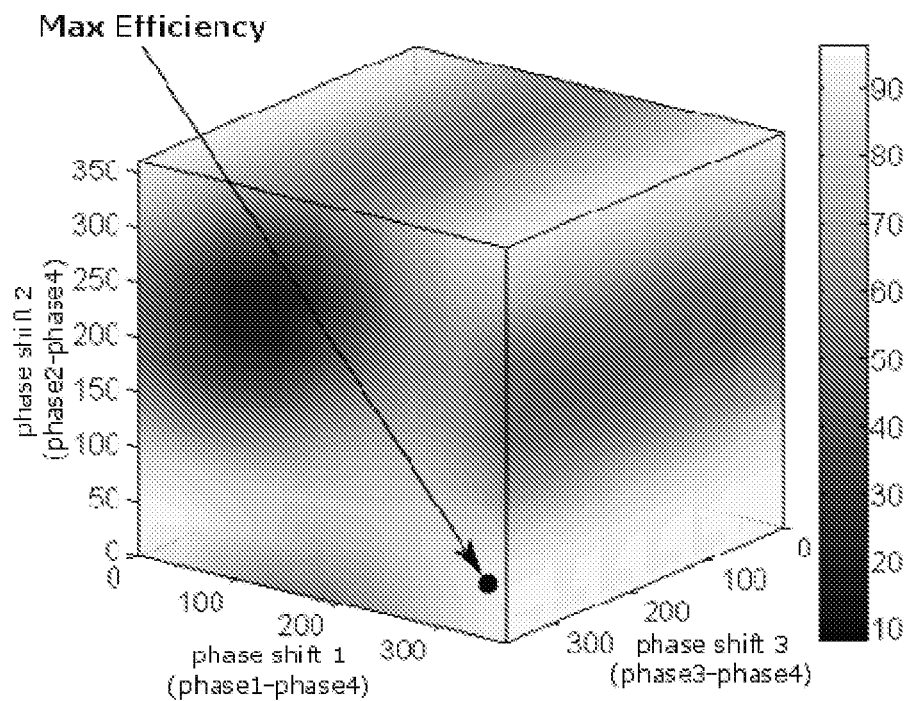
FIG. 3 is an exemplary graph relating to a possible method of use for a microwave heating device according to this disclosure.

The obtained data of energy efficiency for the chosen operational configurations may be electronically saved in order to allow a subsequent processing. For example, data are saved as a data matrix containing all the chosen operational configurations and the corresponding energy efficiency values. For example, FIG. 3 shows a hyperspace in which energy efficiency is mapped in grayscale as a function of three phase shifts.

In particular, the control unit 3 may be configured to operate the microwave generating system in the chosen operational configurations, to calculate the energy efficiency for each of the chosen operational configurations and to save the obtained data into an electronic data storage. In possible methods of use, the data obtained in the learning procedure 100 may be filtered in order to discard any operational configuration not complying with one or more additional requirements, so the operational configurations for the following selection procedure may be less than the operational configurations for the learning procedure.

According to one method of use, the obtained data may be processed in selection algorithm 110 to select one or more operational configurations ranking high in energy efficiency. To be more specific, during the selection algorithm 110, the control unit 3 may be configured to run a selection procedure, according to which the operational configurations of the learning procedure 100 are ranked according to energy efficiency and one or more operational configurations ranking high in energy efficiency are selected. The selected operational configuration(s) can be used in a following heating procedure 120, which may be run by the control unit 3 as well. Different selection criteria may be considered during operation of the selection algorithm 110.

Figure 4:
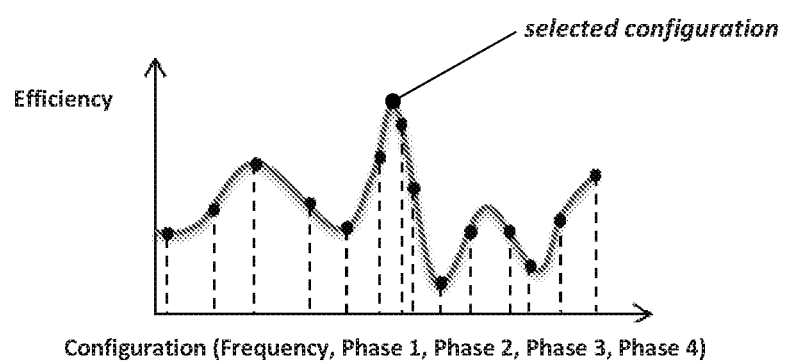
FIGS. 4 to 7 are schematic diagrams of some possible methods of use for a microwave heating device according to this disclosure.

According to a first criterion, the operational configuration with the highest energy efficiency can be selected as a single operational configuration for the heating procedure (FIG. 4). That is, the obtained data are inspected in order to single out the maximum efficiency configuration. Therefore, the product 9 can be heated with maximum efficiency and maximum quickness.

Figure 5:
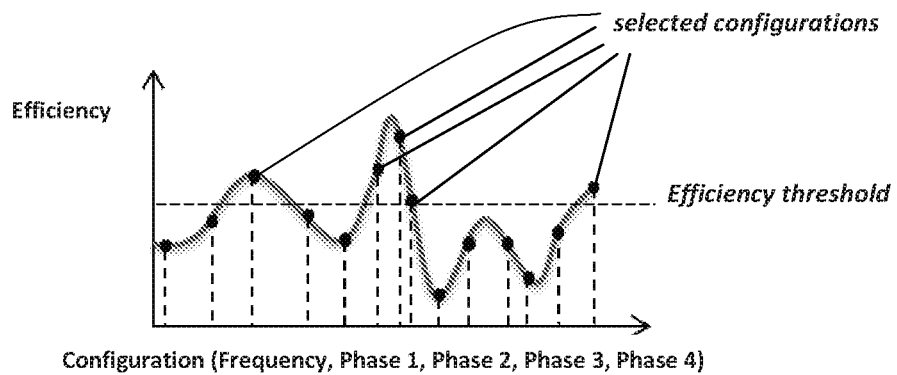

According to a second criterion, a plurality of operational configurations can be selected and each selected configuration has an energy efficiency that is higher than a threshold value of energy efficiency (FIG. 5). That is, the obtained data are inspected and each configuration with efficiency higher than a pre-established threshold (for example, 60%) is selected. Therefore, a certain quickness when heating the product 9 can be ensured in all the selected configurations.

Figure 6:
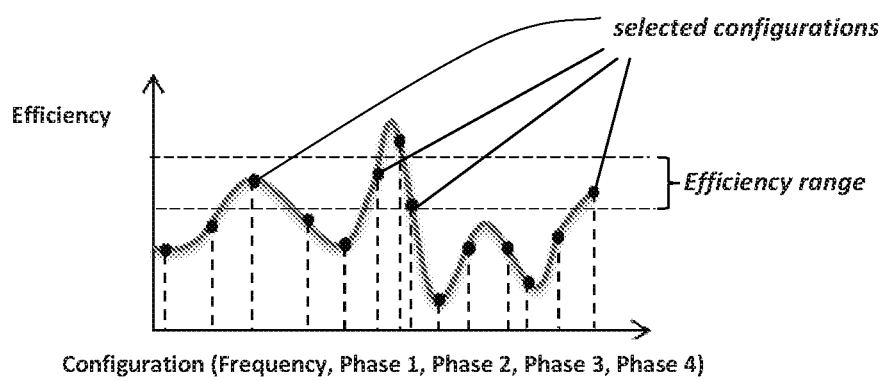

According to a third criterion, a plurality of operational configurations can be selected and each selected configuration has an energy efficiency that is within a range of energy efficiency (FIG. 6). That is, the obtained data are inspected and each configuration with efficiency within a pre-established range (for example, between 60% and 85%) is selected. Therefore, a certain quickness when heating the product 9 can be ensured in all the selected configurations, but strong hot spots related to very high efficiency may be avoided.

Figure 7:
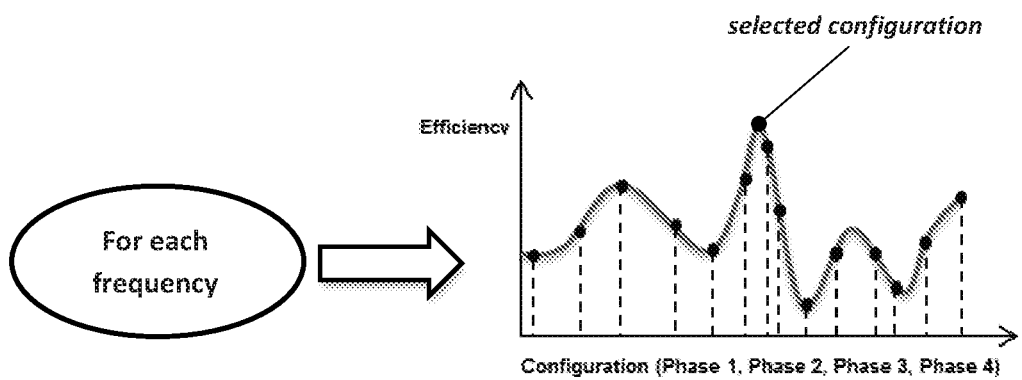

According to a fourth criterion, a plurality of operational configurations can be selected and each selected configuration is the operational configuration with the highest energy efficiency at the respective frequency. That is, the obtained data are inspected and, for some or all frequency values of the learning procedure, the configuration with the highest efficiency at that frequency is singled out and selected (FIG. 7). Therefore, during heating of the product 9, frequency is changed to reduce the significance of hot spots and the maximum quickness is ensured for each frequency.

According to a fifth criterion, a pre-established number of operational configurations are selected and these are the operational configurations ranking higher. That is, the configurations of the obtained data are sorted in descending order according to efficiency and the N configurations (for example, six configurations) ranking higher are selected. This may be seen as an intermediate variant between the second criterion and the fourth criterion.

The control unit 3 may be configured to run one or more of those selection criteria, or a combination thereof.

When a single operational configuration has been selected, the at least two radiating portions 25 may be operated in said single operational configuration during the heating procedure.

When a plurality of operational configurations have been selected, the at least two radiating portions 25 may be sequentially operated in said plurality of operational configurations during the heating procedure. According to some modes of use, during the heating procedure each of the selected operational configurations may be applied for a same time, i.e., the overall heating time may be equally divided among the selected operational configurations.

According to some embodiments, the control unit 3 may be configured to operate the microwave generating system 20 with an adjustable power that is changed between the learning procedure 100 and the heating procedure 120. In particular, the radiated power in the learning procedure 100 is lower than the radiated power in the heating procedure 120. In other words, during the learning procedure 100 the heating chamber 12 may be fed with microwaves having very low power (e.g., an overall power of 20 W), i.e., the power amplifiers 22 may be operated with reduced power (e.g., 5 W each). That may be useful for avoiding a significant heating or cooking of the food product 9 during the learning procedure 100. The learning procedure 100 may last a few seconds, which is a negligible time in comparison with an entire cooking time of several minutes. During the heating procedure 120 the heating chamber 12 may be fed with microwaves having high power, for example the power amplifiers 22 may be operated with power of 200 W.

In other embodiments or modes of use, avoiding a significant heating or cooking during the learning procedure 100 is not an issue. In some cases, for example, heating during the learning procedure 100 may be useful for reducing overall cooking time. Thus, in those cases the learning procedure 100 may be executed with power as high as in the heating procedure 120.

In some methods of use, the heating procedure 120 may be suspended at least one time to repeat the learning procedure 100, so that the heating procedure 120 may be continued with updated operational configurations. In other words, the learning procedure 100 and the heating procedure 120 are alternately repeated more times for the same product 9 in the heating chamber 12, each heating procedure 120 being based on the data obtained in the preceding learning procedure 100. That is useful for adapting the heating procedure 120 to the changing physical characteristics of the food product 9 during heating or cooking.

As already mentioned, the control unit 3 may be configured to run the learning procedure 100, the selection algorithm 110 and the heating procedure 120. In order to carry out those tasks, the control unit 3 may include processing circuitry 31 that may be configured to interface with, control or otherwise coordinate the operations of various components or modules described herein in connection with executing control over such component or modules as described herein. The control unit 3 may utilize the processing circuitry 31 to provide electronic control inputs to one or more functional units of the microwave generating system 20 and/or of the reflected power detecting system, to receive, transmit and/or process data associated with the one or more functional units and perform communications necessary to enable the ability to control operations of the microwave generating system 20 and/or of the reflected power detecting system (or components thereof) as described herein.

In some embodiments, the processing circuitry 31 may be embodied as a chip or chip set. In other words, the processing circuitry 31 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 31 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 31 may include one or more instances of a processor 312 and memory 314 (e.g., volatile or non-volatile memory) that may be in communication with or otherwise control a device interface 33 and a user interface 35. As such, the processing circuitry 31 may be embodied as a circuit chip (e.g., an integrated circuit chip) configured (e.g., with hardware, software or a combination of hardware and software) to perform operations described herein.

The device interface 33 may include one or more interface mechanisms for enabling communication with other devices. In some cases, the device interface 33 may be any means such as a device or circuitry embodied in either hardware, or a combination of hardware and software that is configured to receive and/or transmit data from/to devices or components (e.g., system components) in communication with the processing circuitry 31 via internal and/or external communication mechanisms. Accordingly, for example, the device interface 33 may further include devices and/or means for receiving data from the microwave generating system 20 and/or the reflected power detecting system and/or one or more sensors.

The subject matter of this disclosure may be modified and adapted in several ways without thereby departing from the scope of this disclosure. All details of the invention may be substituted with other technically equivalent elements and the materials used, as well as the shapes and dimensions of the various components, may vary according to requirements. It is therefore evident that the example embodiments described above are non-limiting and that other embodiments are possible, still being covered by the appended claims. Moreover, although the description and the drawings describe examples of combinations of elements and functions, it is evident that embodiments are possible that have different combinations of elements and functions, which in any case are covered by the teaching of this disclosure.

It should also be noticed that the advantages and benefits mentioned with reference to the example embodiments described above do not necessarily have to be present in all of the possible embodiments that are covered by the teaching of this disclosure. The specific terms used in the description are used with a generic and descriptive meaning, not with a limiting purpose.

The invention claimed is:

1. A method for operating a microwave heating device, the microwave heating device comprising a heating chamber and at least two radiating portions that are adapted to radiate microwaves to the heating chamber, wherein the at least two radiating portions can be operated in a plurality of operational configurations that differ in frequency or in phase shift(s) between the radiated microwaves, an energy efficiency being associated with each operational configuration, the method comprising:
   positioning at least one product in the heating chamber;
   obtaining data of energy efficiency, as a function of operational configurations, relating to the at least one product in the heating chamber;
   processing the obtained data by running a selection procedure, in which a plurality of operational configurations are ranked according to energy efficiency to select one or more operational configurations ranking high in energy efficiency; and
   executing a heating procedure for the at least one product in the heating chamber, by operating the at least two radiating portions in the selected one or more operational configurations selected in the selection procedure.

2. The method according to claim 1, wherein a single operational configuration is selected by said data processing, the single operational configuration being the operational configuration with the highest energy efficiency, and wherein, in the heating procedure, the at least two radiating portions are operated in said single operational configuration.

3. The method according to claim 1, wherein multiple operational configurations are selected by said data processing, the selected multiple operational configurations being the operational configurations with an energy efficiency that is higher than a threshold value of energy efficiency, and wherein, in the heating procedure, the at least two radiating portions are sequentially operated in the selected multiple operational configurations.

4. The method according to claim 3, wherein the selected multiple operational configurations are operational configurations with an energy efficiency that is within a range of energy efficiency.

5. The method according to claim 1, wherein multiple operational configurations are selected by said data processing, the selected multiple operational configurations being a pre-established number of operational configurations ranking higher, and wherein, in the heating procedure, the at least two radiating portions are sequentially operated in the selected multiple operational configurations.

6. The method according to claim 1, wherein multiple operational configurations are selected by said data processing, each one of the selected operational configurations being an operational configuration with the highest energy efficiency at the respective frequency, and wherein, in the heating procedure, the at least two radiating portions are sequentially operated in the selected multiple operational configurations.

7. The method according to claim 1, wherein data of energy efficiency are obtained by a learning procedure, in which the at least two radiating portions are sequentially operated in several operational configurations and an energy efficiency is calculated for each of said several operational configurations.

8. The method according to claim 7, wherein the learning procedure and the heating procedure are alternately repeated more times for the same at least one product, each heating procedure being based on the data obtained in the preceding learning procedure.

9. The microwave heating device, configured to be operated with a method according to claim 1.

* * * * *